United States Patent
Elias et al.

(10) Patent No.: US 9,824,227 B2
(45) Date of Patent: Nov. 21, 2017

(54) SIMULATED CONTROL OF A THIRD-PARTY DATABASE

(71) Applicant: Red Hat, Inc., Raleigh, NC (US)

(72) Inventors: Filip Elias, Vysni Lhoty (CZ); Filip Nguyen, Brno (CZ)

(73) Assignee: Red Hat, Inc., Raleigh, NC (US)

( * ) Notice: Subject to any disclaimer, the term of this patent is extended or adjusted under 35 U.S.C. 154(b) by 360 days.

(21) Appl. No.: 14/605,756

(22) Filed: Jan. 26, 2015

(65) Prior Publication Data
US 2016/0217169 A1  Jul. 28, 2016

(51) Int. Cl.
G06F 17/00 (2006.01)
G06F 21/60 (2013.01)
G06F 21/62 (2013.01)

(52) U.S. Cl.
CPC ........ G06F 21/604 (2013.01); G06F 21/6227 (2013.01)

(58) Field of Classification Search
None
See application file for complete search history.

(56) References Cited

U.S. PATENT DOCUMENTS

| | | | |
|---|---|---|---|
| 6,049,821 A | 4/2000 | Theriault et al. | |
| 6,134,549 A | 10/2000 | Regnier et al. | |
| 6,226,635 B1 * | 5/2001 | Katariya | G06F 17/30448 |
| 7,146,409 B1 * | 12/2006 | Bushee | G06F 17/30864 |
| | | | 707/999.003 |
| 7,562,092 B2 | 7/2009 | Fan et al. | |
| 7,739,298 B1 * | 6/2010 | Crim | G06F 21/604 |
| | | | 707/705 |
| 7,865,487 B2 | 1/2011 | Gan et al. | |
| 8,402,017 B2 | 3/2013 | Bender | |
| 8,561,161 B2 | 10/2013 | Blakley, III et al. | |
| 8,881,036 B2 | 11/2014 | Kemmler et al. | |

(Continued)

OTHER PUBLICATIONS

Mehmet Altinel, Christof Bornhovd, Sailesh Krishnamurthy, C. Mohan, Hamid Pirahesh, Berthold Reinwald, Cache Tables: Paving the Way for an Adaptive Database Cache, 2003, 12 pages, IBM Almaden Research Center, 650 Harry Road, San Jose, CA 95120; Comp. Sci. Div, Dept EECS, UC Berkeley, Berkeley, CA 94720 retrieved from http://www.vldb.org/conf/2003/papers/S22P01.pdf on Jan. 16, 2015.

(Continued)

*Primary Examiner* — Hung Le
(74) *Attorney, Agent, or Firm* — Haynes and Boone, LLP (57) ABSTRACT

An example method of providing simulated control of a third-party database to a client includes receiving, at a simulation control proxy, a query that selects data from a database table stored in a third-party database. The method also includes submitting, over a network, the query to the third-party database. The method further includes loading a set of database records included in an initial result set of the query. The method also includes determining whether a data storage device includes modification data indicating that the initial result set is stale. The method further includes updating the initial result set in accordance with the modification data if the initial result set is stale. The method also includes sending the updated result set of the query to a client. The updated result set of the query is different from the initial result set of the query.

20 Claims, 7 Drawing Sheets

(56) References Cited

U.S. PATENT DOCUMENTS

| | | | | |
|---|---|---|---|---|
| 2006/0129540 A1* | 6/2006 | Hillis | ............... | G06F 17/3053 |
| 2006/0282408 A1* | 12/2006 | Wisely | ............ | G06F 17/30867 |
| 2009/0037427 A1* | 2/2009 | Hazlewood | ....... | G06F 17/30584 |
| 2011/0060812 A1* | 3/2011 | Middleton | ........ | G06F 17/30902 |
| | | | | 709/219 |
| 2011/0282866 A1* | 11/2011 | Erickson | ........... | G06F 17/30516 |
| | | | | 707/722 |
| 2012/0124305 A1* | 5/2012 | Weissman | ........... | G06F 12/0223 |
| | | | | 711/160 |
| 2015/0134647 A1* | 5/2015 | Sayyarrodsari | ... | G06F 17/30958 |
| | | | | 707/723 |

OTHER PUBLICATIONS

Cheng Hsu, David Levermore, Christopher Carothers, Gilbert Babin, Enterprise Collaboration: On-Demand Information Exchange Using Enterprise Databases, Wireless Sensor Networks, and RFID Systems, Mar. 2006, 29 pages, Decision Sciences and Engineering Systems, RPI, Troy; Computer Sciences, RPI, Troy, NY; HEC Montreal, Montreal, Quebec, Canada retrieved from http://viu.eng.rpi.edu/publications/ERM%2BMDB%20 CollaborationFinal.pdf on Jan. 16, 2015.
Darren Hamilton, Defa Sun, Michael Wang, Jan Kneschke, Spock Proxy—a proxy for MySQL Horizontal Partitioning, 10 pages, retrieved from http://spockproxy.sourceforge.net/ on Jan. 16, 2015.

* cited by examiner

SIMULATED CONTROL OF A THIRD-PARTY DATABASE

FIELD OF DISCLOSURE

The present disclosure generally relates to data storage, and more specifically to providing simulated control of a third-party database.

BACKGROUND

Companies may use a variety of methods to store data. For example, a company may have an information technology (IT) department that specializes in this area and purchases servers to store company data along with other IT equipment. Alternatively or additionally, the company may request the services of a third party to store data. The company may opt to store its data, for example, with the help of a cloud storage provider that offers data storage to multiple companies. This option may be cheaper for the company because it does not need to invest in servers and other IT equipment.

The company, however, may run into some disadvantages by using a third party to store data. For example, the third party may not allow the company to modify data in the database. To overcome this problem, the company may copy all of the data from the third party's database to another database, and then modify this other database. This approach, however, is inefficient and time consuming. Moreover, some data storage providers do not allow clients to transfer all of their data out of their domain.

BRIEF SUMMARY

Methods, systems, and techniques for providing simulated control of a third-party database to a client are provided.

According to some embodiments, a method of providing simulated control of a third-party database to a client includes receiving, at a simulation control proxy, a query that selects data from a database table stored in a third-party database. The method also includes submitting, over a network, the query to the third-party database. The method further includes loading a set of database records included in an initial result set of the query. The method also includes determining whether a data storage device includes modification data indicating that the initial result set is stale. The method further includes updating the initial result set in accordance with the modification data if the initial result set is stale. The method also includes sending the updated result set of the query to a client. The updated result set of the query is different from the initial result set of the query.

According to some embodiments, a system for providing simulated control of a third-party database to a client includes a modification module that submits, over a network, a query that selects data from a database table stored in a third-party database and that loads a set of database records included in an initial result set of the query. The system also includes a data federation engine that determines whether a data storage device includes modification data indicating that the initial result set is stale, updates the initial result set in accordance with the modification data if the initial result set is stale, and sends the updated result set of the query to a client. The updated result set of the query is different from the initial result set of the query.

According to another embodiment, a machine-readable medium includes a plurality of machine-readable instructions that when executed by one or more processors is adapted to cause the one or more processors to perform a method including: receiving, at a simulation control proxy, a query that selects data from a database table stored in a third-party database; submitting, over a network, the query to the third-party database; loading a set of database records included in an initial result set of the query; determining whether a data storage device includes modification data indicating that the initial result set is stale; updating the initial result set in accordance with the modification data if the initial result set is stale; and sending the updated result set of the query to a client, the updated result set of the query being different from the initial result set of the query.

BRIEF DESCRIPTION OF THE DRAWINGS

The accompanying drawings, which form a part of the specification, illustrate embodiments of the invention and together with the description, further serve to explain the principles of the embodiments. In the drawings, like reference numbers may indicate identical or functionally similar elements. The drawing in which an element first appears is generally indicated by the left-most digit in the corresponding reference number.

DETAILED DESCRIPTION

I. Overview
II. Example System Architecture
III. Process a Query
  A. Store Modification Data Based on a Modification Query
    1. Insert Modification Query
    2. Delete Modification Query
    3. Update Modification Query
  B. Process a Search Query
    1. Modification Data Storage Device May Store Data Based on Modification Queries
    2. Initial Result Set is Provided by the Third-Party Database 3. Determine Whether the Initial Result Set is Stale
4. Update the Initial Result Set if Stale
   a. Update Initial Result Set Based on an Insert Modification Query
   b. Update Initial Result Set Based on a Delete Modification Query
   c. Update Initial Result Set Based on an Update Modification Query IV. Authorization Simulation
V. Example Method
VI. Example Computing System I. Overview It is to be understood that the following disclosure provides many different embodiments, or examples, for implementing different features of the present disclosure. Some embodiments may be practiced without some or all of these specific details. Specific examples of components, modules, and arrangements are described below to simplify the present disclosure. These are, of course, merely examples and are not intended to be limiting.

The present disclosure provides techniques to enables a company to use a third-party database as if the database were under control of the company. Accordingly, it may be less costly and more efficient than loading data from the third-party database into the company's database and periodically fetching updates.

The present disclosure provides techniques to provide simulated control of a third-party database to a client. For example, techniques are provided that allow an entity to store updates to a third-party database without actually updating the third-party database. Modification queries that are sent by clients are not propagated into the third-party database. Rather, modification data based on the modification queries are stored in a modification data storage device.

According to some embodiments, a method of providing simulated control of a third-party database to a client includes receiving, at a simulation control proxy, a query that selects data from a database table stored in a third-party database. The method also includes submitting, over a network, the query to the third-party database. The method further includes loading a set of database records included in an initial result set of the query. The method also includes determining whether a data storage device includes modification data indicating that the initial result set is stale. The method further includes updating the initial result set in accordance with the modification data if the initial result set is stale. The method also includes sending the updated result set of the query to a client. The updated result set of the query is different from the initial result set of the query.

Unless specifically stated otherwise, as apparent from the following discussion, it is appreciated that throughout the description, discussions utilizing terms such as "determining," "generating," "sending," "receiving," "submitting," "loading," "updating," "storing," "creating," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

II. Example System Architecture

Figure 1:
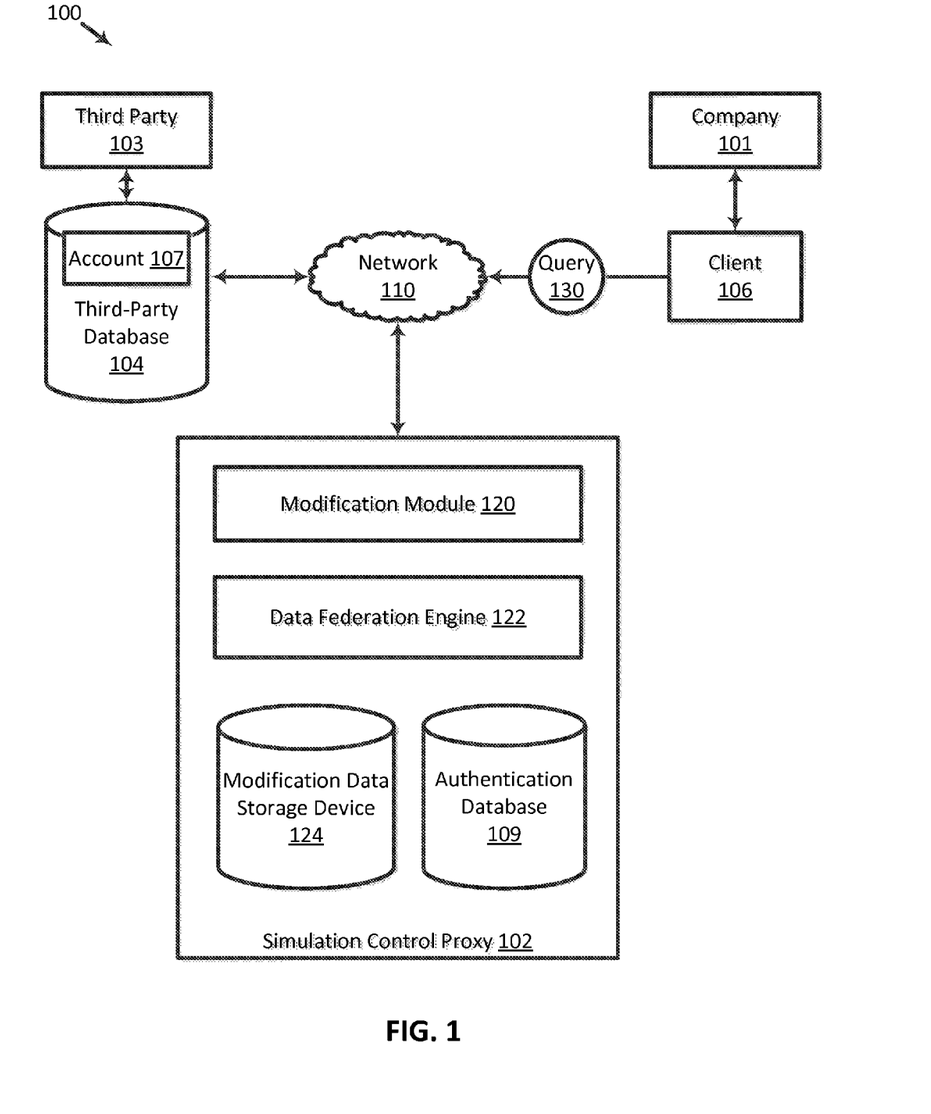
FIG. 1 is a block diagram illustrating a system for providing simulated control of a third-party database to a client, according to some embodiments.

FIG. 1 is a block diagram illustrating a system 100 for providing simulated control of a third-party database to a client, according to some embodiments. System 100 includes a simulation control proxy 102, a third-party database 104, and a client 106 coupled over a network 110.

Network 110 may be a private network (e.g., local area network (LAN), wide area network (WAN), intranet, etc.), a public network (e.g., the Internet), or a combination thereof. The network may include various configurations and use various protocols including virtual private networks, wide area networks, local networks, private networks using communication protocols proprietary to one or more companies, cellular and other wireless networks, Internet relay chat channels (IRC), instant messaging, simple mail transfer protocols (SMTP), Ethernet, Wi-Fi and HTTP, and various combinations of the foregoing.

Client 106 may belong to a company 101 and request the data storage services of a third party 103 to store data. Third party 103 may provide third-party database 104 to multiple companies, and client 106 (along with other clients from the same or different company) may consume data from the database. The entity that controls and manages access to third-party database 104 may be different from the entity to which the data consumer belongs. Client 106 may interact with third-party database 104 by sending queries to the database and receiving response sets of the queries from the database. Third party 103 may not want any one service consumer to have unfettered control of third-party database 104 because, for example, companies (including client 106's company) may store confidential information into third-party database 104. As such, third party 103 may want to prohibit a company from accessing another company's data or from modifying third-party database 104.

Third-party database 104 may have an account 107 for company 101. Account 107 may store information about company 101 and which data in third-party database 104 is company 101's data. Simulation control proxy 102 may include an authentication database 109 that is associated with account 107. Authentication database 109 will be explained in more detail below.

Third-party database 104 may be a relational database including one or more database tables. Each table may have one or more table columns and zero or more database records. Each database record may include a primary key (or a primary key set) that uniquely identifies the database record from other database records in the table. Third party 103 may allow client 106 to execute queries that select data from tables stored in third-party database 104 against the database, and retrieve that data. To prevent client 106 (or any other data consumer) from having unfettered control of third-party database 104, third party 103 may prevent the client from modifying third-party database 104. For example, the third party may prevent client 106 from executing queries that insert data, remove data, or update values stored in third-party database 104 against the database. Accordingly, client 106 is unable to modify third-party database 104. This may be inconvenient for client 106 because employees in company 101 may want to insert data, remove data, and/or update values stored in third-party database 104.

Simulation control proxy 102 may provide simulated control of third-party database 104 to client 106 (or any other data consumer that consumes data from third-party database 104) such that the client may store updates to third-party database 104 in a modification data storage device 124 that are retrieved at a later point in time. Simulation control proxy 102 includes a modification module 120 and a data federation engine 122 coupled to modification data storage device 124. Client 106 may submit a query 130 to third-party database 104, and simulation control proxy 102 may intercept query 130 and process it. A query may include an expressions clause (e.g., table columns from which or calculations that a client desires to retrieve), one or more database tables from which to retrieve the data requested by the client, and zero or more conditions clauses (e.g., condition(s) that must be met for a database record to be selected). In an example, a query may be a Structured Query Language (SQL) query of the form "SELECT Column1, Column2, . . . , ColumnX FROM Table1, Table2, . . . , TableY WHERE Condition1, Condition2, . . . , ConditionZ."

As will be discussed further below, modification module 120 obtains query 130 and performs actions on it based on whether query 130 is a query that selects data from third-party database 104 or is a query that modifies third-party database 104. Modification module 120 may receive a query and determine whether it is a modification query that modifies third-party database 104. For example, a modification query may be an insert command that inserts a set of one or more database records into one or more tables, a delete command that removes a set of one or more database records from one or more tables, or an update command that updates one or more values in a set of one or more database records in one or more tables. To determine whether a query is a modification query, modification module 120 reads the query. In an example, if a query includes a select command, modification module 120 may determine that the query is not a modification query. In contrast, if a query includes an insert, delete, or update command, modification module 120 may determine that the query is a modification query.

III. Process a Query

A. Store Modification Data Based on a Modification Query

1. Insert Modification Query

Figure 2A:
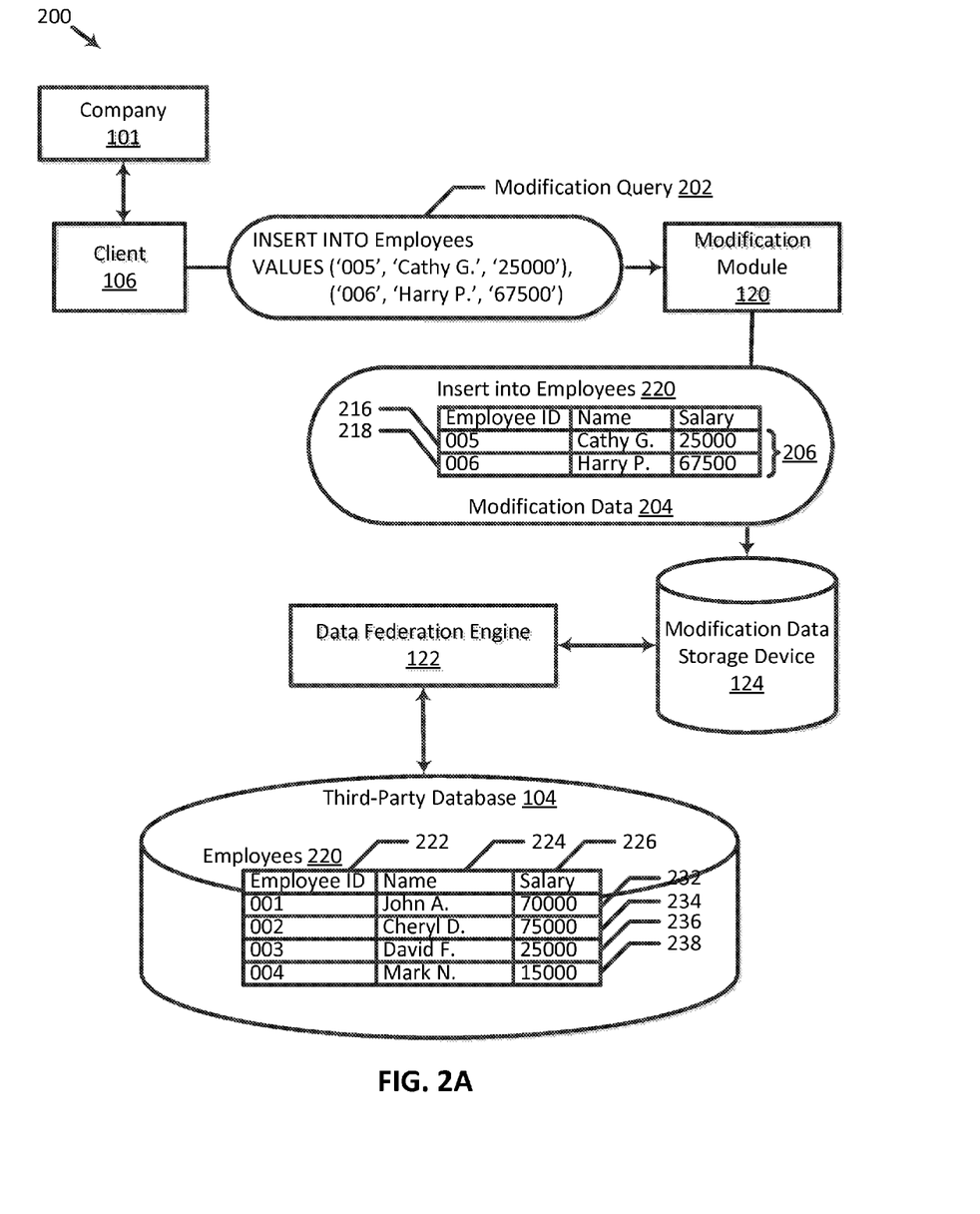
FIG. 2A illustrates a process flow of a simulation control proxy processing an insert modification query that modifies a third-party database, according to some embodiments.

FIG. 2A illustrates a process flow 200 of simulation control proxy 102 processing an insert modification query that modifies third-party database 104, according to some embodiments. In FIG. 2A, third-party database 104 includes a table "Employees" 220, which includes column "Employee ID" 222, column "Name" 224, and column "Salary" 226. Table "Employees" 220 includes database records 232, 234, 236, and 238 that store information about the employees in company 101. Column "Employee ID" 222 may be the primary key that uniquely identifies a database record in table "Employees" 220. For example, primary key "001" may uniquely identify database record 232 in table "Employees" 220. For brevity and simplicity, third-party database 104 is shown as including one table. It should be understood, however, that third-party database 104 may include more than one table, and each table may have zero or more database records.

Client 106 may send a modification query 202 to third-party database 104 for execution, and modification module 120 may intercept modification query 202 before it reaches third-party database 104. In another example, client 106 sends modification query 202 to simulation control proxy 102. In FIG. 2A, modification query 202 is an insert modification query including a command that inserts two database records into table "Employees" 220. In particular, modification query 202 includes "INSERT INTO Employees VALUES ('005', "Cathy G.', '25000'), ('006', "Harry P.', '67500')."

Modification module 120 stores updates to third-party database 104 in modification data storage device 124. In some embodiments, modification module 120 stores modification data in modification data storage device 124 as an indication that data included in an initial result set provided by third-party database 104 is stale. The modification data is based on a modification query, and indicates one or more modifications to one or more tables stored in third-party database 104. The modifications are based on the modification query, and modification data may be used at a later point in time to determine whether an initial result set provided by third-party database 104 includes stale data.

In FIG. 2A, modification module 120 may generate modification data 204 including a set of database records 206 based on modification query 202. Modification data 204 indicates that table "Employees" 220 in third-party database 104 should include two additional database records. For example, set of database records 206 includes database records 216 and 218, which client 106 is requesting to be added to third-party database 104 because "Cathy G." and "Harry P." are two new employee hires at company 101.

Rather than execute modification query 202 at third-party database 104, modification module 120 may generate set of database records 206 based on modification query 202, and store set of database records 206 into modification data storage device 124 with an indication that set of database records 206 should be inserted into table "Employees" 220. Modification query 202 includes the name(s) of the table(s) modified in third-party database 104. In particular, modification query 202 includes "Employees," the table name into which set of database records 206 should be inserted. Modification data 204 and set of database records 206 correspond to table "Employees" 220 because the modification data includes data that updates this table.

2. Delete Modification Query

In the example illustrated in FIG. 2A, modification query 202 is an insert modification query including a command to insert a set of database records into table "Employees" 220. In other examples, a modification query may be a delete modification query that removes a set of database records from third-party database 104 or may be an update modification query that updates one or more values in third-party database 104.

Figure 2B:
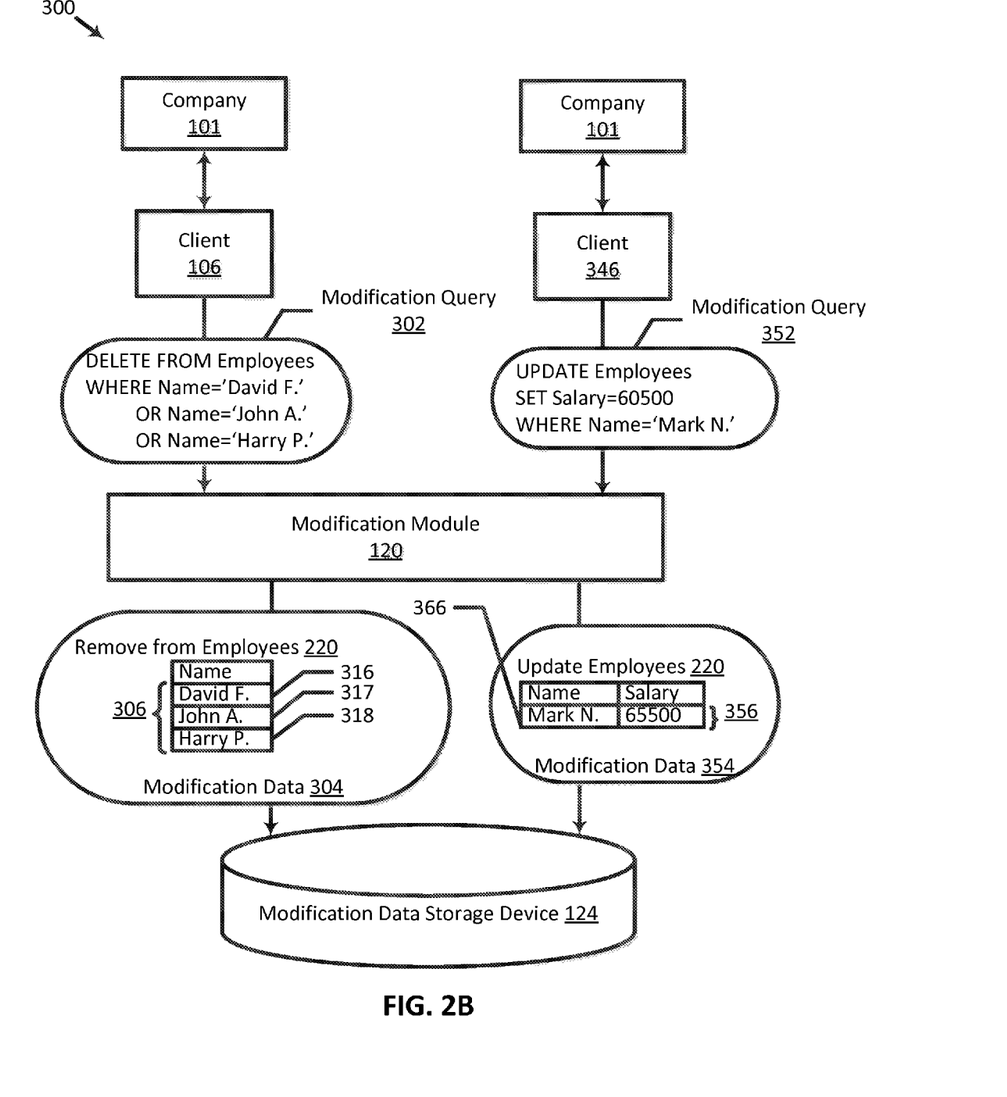
FIG. 2B illustrates a process flow of the simulation control proxy processing a delete modification query and an update modification query that modify the third-party database, according to some embodiments.

FIG. 2B illustrates a process flow 300 of simulation control proxy 102 processing a delete modification query and an update modification query that modify third-party database 104, according to some embodiments. In FIG. 2B, client 106 sends a modification query 302, which is a delete modification query including a command that removes a set of database records from table "Employees" 220. In particular, modification query 302 includes "DELETE FROM Employees WHERE Name='David F.' OR Name='Mark N.' OR Name='Harry P.'"

In FIG. 2B, modification module 120 may generate modification data 304 including a set of database records 306 based on modification query 302. Modification data 304 indicates that three database records should be removed from table "Employees" 220 in third-party database 104. Set of database records 306 includes database records 316, 317, and 318, which client 106 is requesting to be removed from third-party database 104 because "David F.", "John A.", and "Harry P." are no longer employed at company 101.

Rather than execute modification query 302 at third-party database 104, modification module 120 may generate set of database records 306 based on modification query 302, and store set of database records 306 into modification data storage device 124 with an indication that database records stored in third-party database 104 and that correspond to set of database records 306 should be removed from table "Employees" 220. Modification query 302 includes the name(s) of the table(s) that is modified in third-party database 104. In particular, modification query 302 includes "Employees," the table name from which a set of database records should be removed. Modification data 304 and set of database records 306 correspond to table "Employees" 220 because the modification data includes data that updates this table.

3. Update Modification Query

Additionally, in FIG. 2B, a client 346 belonging to company 101 sends a modification query 352, which is an update modification query including a command that updates one or more values in a set of database records in table "Employees" 220. In particular, modification query 352 includes "UPDATE Employees SET Salary=65500 WHERE Name='Mark N.'"

In FIG. 2B, modification module 120 may generate modification data 354 including a set of database records 356 based on modification query 352. Modification data 354 indicates that the value of the Salary column in database records that are stored in table "Employees" 220 and that correspond to set of database records 356 should be updated. For example, set of database records 356 includes a database record 366, which includes the employee name "Mark N." and the salary value of "65500." Database record 366 includes data that updates database record 238 in third-party database 104 because, for example, Mark N. received a raise.

Rather than execute modification query 352 at third-party database 104, modification module 120 may generate set of database records 356 based on modification query 352, and store set of database records 356 into modification data storage device 124. Modification query 352 includes the name(s) of the table(s) that is modified in third-party database 104. In particular, modification query 352 includes "Employees," the table name from which a set of database records that is included in third-party database 104 and that corresponds to set of database records 366 should be updated. Modification data 354 and set of database records 356 correspond to table "Employees" 220 because the modification data includes data that updates this table. Additionally, database record 366 corresponds to database record 238 because database record 366 includes data that updates the value in column "Salary" 226 of database record 238 to the value "65500."

B. Process a Search Query

A modification query is not executed at third-party database 104 and thus this database may or may not store the most up-to-date data. For example, if a client submits a search query selecting data from table "Employees" 220, third-party database 104 returns an initial result set that may or may not include the most up-to-date data. Rather, as discussed above, sets of database records 206, 306, and 356 (see FIGS. 2 and 3) are stored in modification data storage device 124, and their corresponding modification queries are not executed at third-party database 104. Accordingly, third-party database 104 may receive a search query and return an initial result set that is stale and does not include the most up-to-date data (e.g., data based on sets of database records 206, 306, and/or 356).

Figure 3:
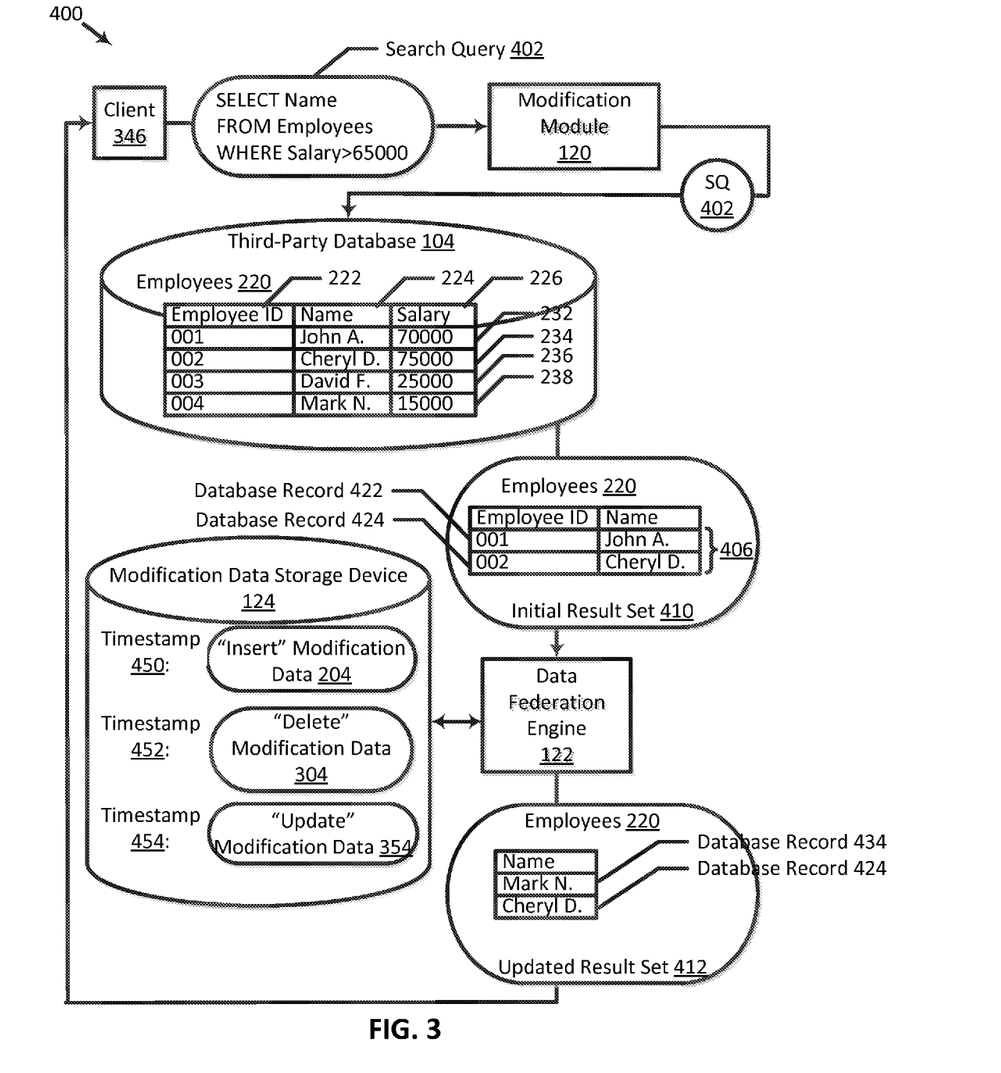
FIG. 3 illustrates a process flow of the simulation control proxy processing a search query that selects data from the third-party database, according to some embodiments.

In some embodiments, data federation engine 122 may interact with third-party database 104 and modification data storage device 124 to obtain the most up-to-date result set of a search query, and may submit the updated result set to the requesting client in lieu of the initial result set returned by third-party database 104. FIG. 3 illustrates a process flow 400 of simulation control proxy 102 processing a search query that selects data from third-party database 104, according to some embodiments. A search query selects data from one or more database records in one or more tables stored in third-party database 104.

1. Modification Data Storage Device May Store Data Based on Modification Queries In FIG. 3, modification data storage device 124 includes "insert" modification data 204, which is based on an insert modification query (e.g., modification query 202) and includes an indication that set of database records 206 is to be inserted into table "Employees" 220 (see FIG. 2A). Modification module 120 may store modification data 204 with a timestamp 450 indicating the date and time at which modification query 202 corresponding to modification data 204 was received.

Additionally, modification data storage device 124 includes "delete" modification data 304, which is based on a delete modification query (e.g., modification query 302) and includes an indication that a set of database records stored in third-party database 104 and that corresponds to set of database records 306 is to be removed from table "Employees" 220 (see FIG. 2B). Modification module 120 may store modification data 304 with a timestamp 452 indicating the date and time at which modification query 302 corresponding to modification data 304 was received.

Additionally, modification data storage device 124 includes "update" modification data 354, which is based on an update modification query (e.g., modification query 352) and includes an indication that a set of database records stored in third-party database 104 and that corresponds to set of database records 356 is to be updated in table "Employees" 220 (see FIG. 2B). Modification module 120 may store modification data 354 with a timestamp 454 indicating the date and time at which modification query 352 corresponding to modification data 354 was received.

In FIG. 3, client 346 sends a search query 402 to third-party database 104 for execution, and modification module 120 may intercept search query 402 before it reaches third-party database 104. In another example, client 346 sends search query 402 to simulation control proxy 102. Search query 402 includes a command that selects one or more values from column "Name" 224 in the Employees table, where the value in column "Salary" 226 is greater than 65000. In other words, search query 402 is a search for employees who earn more than $65,000. Search query 402 includes the name of the table from which data is selected along with the conditions for selecting database records in the table. Search query 402 includes "SELECT Name FROM Employees WHERE Salary>65000."

2. Initial Result Set is Provided by the Third-Party Database

Modification module 120 may submit, over a network, search query 402 to third-party database 104. Third-party database 104 may receive search query 402 and execute it against one or more database tables in the database. Third-party database 104 may retrieve an initial result set 410, which is a result set of search query 402. Initial result set 410 includes data from one or more database records in one or more database tables stored in third-party database 104. In FIG. 3, initial result set 410 includes the name of the table from which data is selected based on search query 402 (e.g., table "Employees" 220) and also includes a set of database records 406 including database records 422 and 424. Initial result set 410 corresponds to a table stored in third-party database 104 if initial result set 410 includes data selected from that table. For example, initial result set 410 corresponds to table "Employees" 220 because database records 422 and 424 include data selected from table "Employees" 220. Additionally, the database records included in initial result set 410 also correspond to table "Employees" 220.

In some examples, a first database record included in initial result set 410 corresponds to a second database record stored in third-party database 104 if the first database record includes data selected from the second database record. In some examples, a first database record included in initial result set 410 corresponds to a second database record stored in third-party database 104 if a primary key in the first database record matches a primary key in the second database record. In FIG. 3, database record 422 includes the primary key "001" and the employee name "John A." Database record 422 corresponds to database record 232 because database record 422 includes data selected from database record 232. Additionally, the primary key "001" in database record 422 matches the primary key "001" in database record 232. Similarly, database record 424 includes the primary key "002" and the employee name "Cheryl D." Database record 424 corresponds to database record 234 because database record 424 includes data selected from database record 234. Additionally, the primary key "002" in database record 424 matches the primary key "002" in database record 234.

Third-party database 104 sends initial result set 410 to simulation control proxy 102. In the example illustrated in FIG. 3, initial result set 410 includes the primary keys in the selected database records. In another example, initial result set 410 does not include the primary keys in the selected database records. In this example, data federation engine 122 may obtain the primary keys of database records by querying third-party database 104 for them. Data federation engine 122 obtains initial result set 410, loads the set of database records included in initial result set 410 into a memory coupled to simulation control proxy 102, and reads the data included in initial result set 410 from the memory.

3. Determine Whether the Initial Result Set is Stale

In some embodiments, data federation engine 122 determines whether modification data storage device 124 includes modification data indicating that initial result set 410 is stale. Modification data may indicate that initial result set 410 is stale if the modification data includes data that updates initial result set 410. Data federation engine 122 sends initial result set 410 to client 346 if the modification data stored in modification data storage device 124 does not indicate that initial result set 410 is stale. In contrast, data federation engine 122 updates initial result set 410 in accordance with the modification data if initial result set 410 is stale, and sends the updated result set to client 346 in lieu of initial result set 410 of search query 402.

In some examples, to determine whether initial result set 410 is stale, data federation engine 122 determines whether initial result set 410 and modification data (e.g., modification data 204, 304, or 354) stored in modification data storage device 124 correspond to the same table. Data federation engine 122 may identify the table corresponding to initial result set 410 and search modification data storage device 124 for data corresponding to the table (e.g., table "Employees" 220). If initial result set 410 and the modification data correspond to the same table, data federation engine 122 may determine whether to update initial result set 410 based on the modification data.

In FIG. 3, "insert" modification data 204, "delete" modification data 304, and "update" modification data 354 correspond to table "Employees" 220 because modification data 204, 304, and 354 include data that updates table "Employees" 220. Additionally, initial result set 410 corresponds to table "Employees" 220 because initial result set 410 includes data selected from table "Employees" 220. Accordingly, modification data 204 and initial result set 410 correspond to the same table. Additionally, each of "insert" modification data 204, "delete" modification data 304, and "update" modification data 354 updates table "Employees" 220.

4. Update the Initial Result Set if Stale

In some embodiments, data federation engine 122 updates initial result set 410 in accordance with the modification data if the initial result set is stale. The updated result set is based on initial result set 410 and the relevant modification data stored in modification data storage device 124. Data federation engine 122 may read the timestamps of the relevant modification data and process them in chronological order. In an example, timestamp 450 is before timestamp 452, which is before timestamp 454. In this example, data federation engine 122 may first process modification data 204, then modification data 304, and lastly modification data 354. FIGS. 1-4, 5A, and 5B are discussed together to better explain how data federation engine 122 may process a search query.

a. Update Initial Result Set Based on an Insert Modification Query

Modification data 204 is based on modification query 202, which is an insert modification query including a command to insert set of database records 206 into table "Employees" 220 (see FIG. 2A). If the modification data indicating that initial result set 410 is stale is based on an insert modification query, data federation engine 122 may update initial result set 410 by adding data from set of database records 206 to initial result set 410, where the added data satisfies search query 402. For example, data federation engine 122 may update initial result set 410 by adding one or more database records to initial result set 410.

In FIGS. 2 and 4, modification data 204 indicates that two database records are to be added to table "Employees" 220, and includes data that satisfies search query 402. In FIG. 2A, database record 218 satisfies search query 402 because "Harry P." is an employee who earns more than $65,000. Thus, modification data 204 includes data that updates initial result set 410 because "Harry P." should be added to initial result set 410. Data federation engine 122 retrieves the data from set of database records 206 satisfying search query 402, and merges the data ("Harry P.") from set of database records 206 with initial result set 410 to create an updated result set, which may also be referred to as an intermediate result set because it may be further modified based on modification data 304 and/or modification data 354.

Figure 4A:
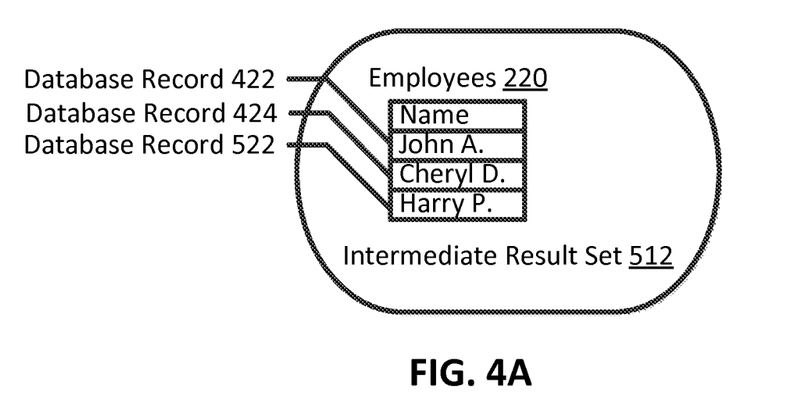
FIG. 4A illustrates an example intermediate result set that is created based on merging an initial result set with the data included in modification data that satisfies the search query, according to some embodiments.

FIG. 4A illustrates an example intermediate result set 512 that is created based on merging initial result set 410 with the data included in modification data 204 that satisfies search query 402, according to some embodiments. Intermediate result set 512 is based on initial result set 410 and modification data 204, and includes three database records. The three database records include database records 422 and 424 (from initial result set 410), and an added database record 522 including the employee name "Harry P," who earns over $65,000 per year. Database record 522 corresponds to database record 218, which includes the primary key "006" and the employee name "Harry P.", because database records 522 and 218 have the same value in their corresponding Name column. Intermediate result set 512 is different from initial result set 410, which was provided by third-party database 104. Accordingly, it may be unnecessary to execute modification query 202 at third-party database 104 in order to retrieve data from the set of newly inserted database records.

b. Update Initial Result Set Based on a Delete Modification Query

Intermediate result set 512 based on modification query 202 may be referred to as the current result set or intermediate result set, and may be further modified by data federation engine 122 to determine the most up-to-date result set to return to client 346. Modification data 304 is based on modification query 302, which is a delete modification query including a command to remove a set of database records from table "Employees" 220 (see FIG. 2B). Intermediate result set 512 is stale if modification data 304, which is based on a delete modification query, indicates that a database record is to be removed from the intermediate result set. If the modification data indicating that intermediate result set 512 is stale is based on a delete modification query, data federation engine 122 may update result set 512 by removing one or more database records from intermediate result set 512, where the removed database records match a database record of set of database records 306.

In FIGS. 3 and 4, modification data 304 indicates that three database records are to be removed from table "Employees" 220. A first database record included in a result set matches a second database record included in modification data 304 if a column value in the first database record matches the corresponding column value in the second database record. For example, database record 422 of intermediate result set 512 matches database record 317 included in modification data 304 because both database records have the value "John A." in their Name columns and correspond to the same table. Similarly, database record 522 of intermediate result set 512 matches database record 318 included in modification data 304 because both database records have the value "Harry P." in their Name columns and correspond to the same table. Data federation engine 122 retrieves the data from modification data 304 and merges the data with intermediate result set 512 to create an updated result set, which may also be referred to as an intermediate result set because it may be further modified based on modification data 354.

Figure 4B:
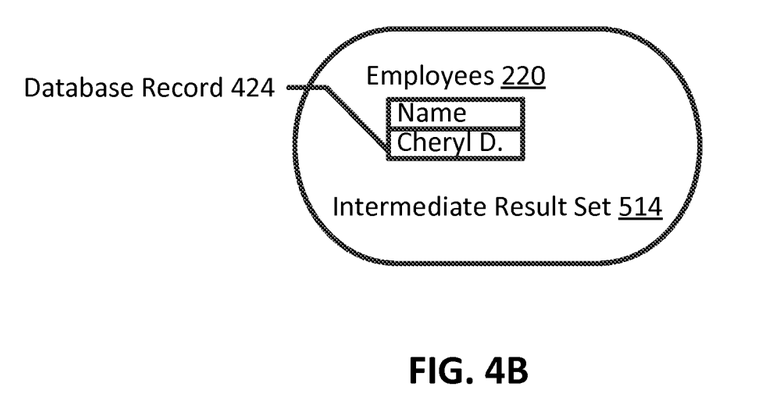
FIG. 4B illustrates an example intermediate result set that is created based on merging another intermediate result set with the data included in modification data, according to some embodiments.

FIG. 4B illustrates an example intermediate result set 514 that is created based on merging intermediate result set 512 with the data included in modification data 304, according to some embodiments. Data federation engine 122 updates intermediate result set 512 by removing database records 422 and 522 from the intermediate result set. Intermediate result set 514 is based on initial result set 410, modification data 204, and modification data 304, and includes a single database record 424 including the employee name, "Cheryl D." Intermediate result set 514 does not include database records 422 or 522 because their corresponding database records in table "Employees" 220 should be removed based on modification query 302. Intermediate result set 514 is different from initial result set 410, which was provided by third-party database 104. Accordingly, it may be unnecessary to execute modification query 302 at third-party database 104 in order to determine which database records to remove from an intermediate result set (or from initial result set 410).

c. Update Initial Result Set Based on an Update Modification Query

Modification data 354 is based on modification query 352, which is an update modification query including a command to update one or more values in a set of database records in table "Employees" 220 (see FIG. 2B). Intermediate result set 514 is stale if modification data 354, which is based on an update modification query, indicates that the intermediate result set is to be updated. Initial result set 410 is stale if modification data 354 indicates that one or more values in one or more database records in the current result set (or initial result set 410 if modification query 352 is the first query processed) is to be updated.

In some examples, if the modification data indicating that intermediate result set 514 is stale is based on an update modification query, data federation engine 122 may update result set 514 by replacing one or more values in the intermediate result set with one or more values based on the modification data. For example, if modification data 354 indicates that employee "Cheryl D." recently changed her last name and is now "Cheryl G., data federation engine 122 may replace "Cheryl D." in database record 424 with "Cheryl G." In this example, the updated result set includes one database record including "Cheryl G.", and this database record is sent to client 346.

In some embodiments, data federation engine 122 searches modification data storage device 124 based on the primary keys included in initial result set 410. If data federation engine 122 determines that a first database record included in initial result set 410 has the same primary key as associated data in modification data storage device 124, data federation engine 122 may replace the value in the first database record with a value based on the associated data.

In some examples, if the modification data indicating that intermediate result set 514 is stale is based on an update modification query, data federation engine 122 may update result set 514 by removing one or more database records from intermediate result set 514, where the removed database records no longer satisfy the search query. For example, if modification data 354 indicates that the salary of employee "Cheryl D." was reduced to $59,000 and requested this salary update in table "Employees" 220, data federation engine 122 may remove database record 424 from intermediate result set 514 because "Cheryl D." no longer earns over $65,000 and thus does not satisfy search query 402. In this example, the updated result set is an empty set, and data federation engine 122 may notify client 346 that no employees satisfy the search criterion.

In some examples, if the modification data indicating that intermediate result set 514 is stale is based on an update modification query, data federation engine 122 may update result set 514 by adding data based on the modification data to intermediate result set 514, where the added data satisfies search query 402. In the example illustrated in FIG. 2A, modification data 354 indicates that the salary of employee "Mark N." was increased to $65,500 and requested this salary update in table "Employees" 220. Data federation engine 122 may add a database record 434 to intermediate result set 514 because "Mark N." earns over $65,000 and thus satisfies search query 402. Data federation engine 122 may create updated result set 412 based on search query 402, modification data 204, modification data 304, and modification data 354. Updated result set 412 includes database records 434 and 424, and is different from initial result set 410, which was provided by third-party database 104. Updated result set 412 is the correct result set of search query 402. Accordingly, it may be unnecessary to execute modification query 354 at third-party database 104 in order to retrieve updated data. Data federation engine 122 may send updated result set 412 to client 346 in lieu of initial result set 410.

It should be understood that modification data that corresponds to the same table as initial result set 410 may or may not update initial result set 410. The determination of whether initial result set 410 is stale may be based on the search query and what data is requested.

As discussed above and further emphasized here, FIGS. 1-4, 5A, and 5B are merely examples, which should not unduly limit the scope of the claims. For example, it should be understood that one or more modules or components in FIG. 1 (e.g., modification module 120 and data federation engine 122) may be combined with another module or component. It should also be understood that one or more modules or components in FIG. 1 may be separated into more than one module or component.

Additionally, although the term "intermediate result set" is used, it should be understood that the initial result set provided by third-party database 104 may instead be updated if the associated modification data is processed first. For example, modification data 304 in FIG. 3 may update initial result set 410 (rather than an intermediate result set) if modification data 304 is processed before modification data 204 and modification data 354. In another example, modification data 354 in FIG. 3 may update initial result set 410 (rather than an intermediate result set) if modification data 354 is processed before modification data 204 and modification data 304.

Further, in FIGS. 2 and 3, modification module 120 generates modification data including a set of database records. In this example, modification module 120 creates the set of database records and stores the set into modification data storage device 124. In some examples, modification data may include data different from or in addition to the set of database records. In an example, modification data 204 includes the modification query, and modification module 120 stores the modification query into modification data storage device 124. In this example, data federation engine 122 may update initial result set 410 by identifying the relevant data, which is the modification query, in modification data storage device 124, and creating a set of database records based on the stored modification query.

For example, in reference to FIG. 2A, modification module 120 may store modification query 202 into modification data storage device 124. In response to search query 402 in FIG. 3, data federation engine 122 may receive initial result set 410, identify modification query 202 stored in modification data storage device 124 as corresponding to the same table as initial result set 410, and create set of database records 206. Data federation engine 122 may retrieve the data that satisfies search query 402 and update initial result set 410 in accordance with the retrieved data.

Additionally, to reduce the time it takes to process a search query, data federation engine 122 may periodically condense the data in modification data storage device 124 based on overlapping data. For example, if simulation control proxy 102 receives a modification query that updates database record 236 in third-party database 104 and then deletes database record 236, modification module 120 may store modification data based on the update modification query and the delete modification query. Data federation engine 122 may identify this overlapping modification data and remove the modification data based on the update. Additionally, if simulation control proxy 102 receives a first modification query that updates a value in database record 236 and then receives a second modification query that updates the value in database record 236, data federation engine 122 may remove the modification data associated with the first modification query, thus eliminating actions taken to arrive at the final result set that is returned to the client.

IV. Authorization Simulation

Referring back to FIG. 1, simulation control proxy 102 includes an authentication database 109 that stores one or more user credentials associated with account 107 in third-party database 104. Simulation control proxy 102 may store user credentials of employees belonging to company 101 in authentication database 109. Simulation control proxy 102 may authenticate users based on their user credentials.

Third-party database 104 may have one account (e.g., account 107) for company 101. Account 107 may be associated with company 101's data stored in third-party database 104. Third-party database 104 may store confidential information that company 101 does not want accessible to all of its employees, and so may not want to provide all of its employees with unfettered access to the data in third-party database 104. If an employee at company 101 wants to load from or modify data stored in third-party database 104, the employee may provide her own user credentials and simulation control proxy 102 may authenticate them with the data stored in authentication database 109. Additionally, simulation control proxy 102 may determine whether client 106 is authorized perform the action associated with query 130. In this way, simulation control proxy 102 may ensure that the user requesting particular information or requesting that data in third-party database 104 be modified has the authority to perform that action.

In some embodiments, simulation control proxy 102 map account 107 stored in third-party database 104 to a plurality of user credentials stored in authentication database 109. The plurality of user credentials may be used by different employees belonging to company 101. Account 107 may be authenticated based on first user credentials. Simulation control proxy 102 may authenticate second user credentials provided by client 106 and may also determine whether client 106 is authorized to submit query 130 to third-party database 104. Simulation control proxy 102 may determine which employees are authorized to perform which operations (e.g., execute search queries, insert modification queries, delete modification queries, or update modification queries) based on their user credentials. If client 106 is authorized to retrieve data from table "Employees" 220, and query 130 is a select query that retrieves data from table "Employees" 220, then simulation control proxy 102 may provide the appropriate credentials to third-party database 104 so that it returns an initial result set of query 130. In another example, if client 106 is not authorized to modify table "Employees" 220, and query 130 is a modification query that modifies table "Employees" 220, then simulation control proxy 102 may provide a response back to client 106 that the request failed. In another example, if client 106 is only authorized to retrieve data from table "Employees" 220 and no other tables in third-party database 104, and query 130 is a select query that retrieves data from a table other than table "Employees" 220, then simulation control proxy 102 may provide a response back to client 106 that the request failed.

Simulation control proxy 102 may provide the first user credentials and query 130 to third-party database 104 if client 106 is authenticated and authorized to submit query 130 to third-party database 104. Accordingly, simulation control proxy 102 may provide client 106 with simulated control over the "management of accounts" for third-party database 104. For example, if client 106 has the authority to delete accounts from authentication database 109, client 109 may want to delete those accounts associated with employees no longer with company 101. In this example, client 106 may send a request to simulation control proxy 102 to remove or void particular accounts or user credentials stored in authentication database 109 associated with those employees no longer with company 101. Accordingly, if a former employee attempts to access third-party database 104 with her old user credentials, simulation control proxy 102 may return a response to the former employee that her request was unsuccessful.

V. Example Method

Figure 5:
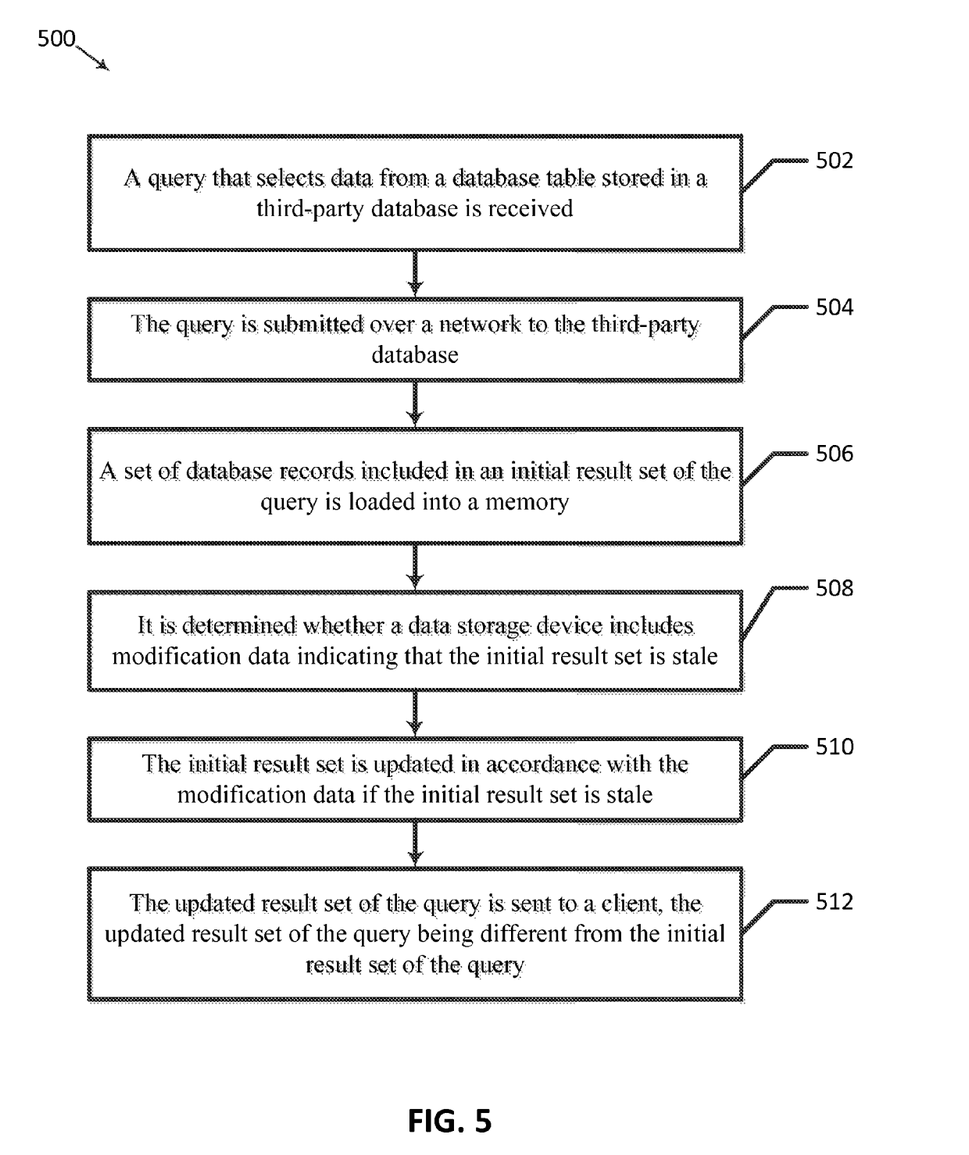
FIG. 5 is a flowchart illustrating a method of providing simulated control of a third-party database to a client, according to some embodiments.

FIG. 5 is a flowchart illustrating a method 500 of providing simulated control of a third-party database to a client, according to some embodiments. Method 500 is not meant to be limiting and may be used in other applications In FIG. 5, method 500 includes blocks 502-512. In a block 502, a query that selects data from a database table stored in a third-party database is received. In an example, simulation control proxy 102 receives search query 402 that selects data from table "Employees" 220 stored in third-party database 104. In a block 504, the query is submitted over a network to the third-party database. In an example, simulation control proxy 102 submits, over network 110, search query 402 to third-party database 104.

In a block 506, a set of database records included in an initial result set of the query is loaded into a memory coupled to simulation control proxy 102. In an example, simulation control proxy 102 loads set of database records 406 included in initial result set 410 of query 130 into a memory coupled to simulation control proxy 102. In a block 508, it is determined whether a data storage device includes modification data indicating that the initial result set is stale. In an example, data federation engine 122 determines whether modification data storage device 124 includes modification data 204 indicating that initial result set 410 is stale.

In a block 510, the initial result set is updated in accordance with the modification data if the initial result set is stale. In an example, data federation engine 122 updates initial result set 410 in accordance with modification data 204 if initial result set 410 is stale. In a block 512, the updated result set of the query is sent to a client, the updated result set of the query being different from the initial result set of the query. In an example, simulation control proxy 102 sends updated result set 412 of query 130 to a client, updated result set 412 of query 130 being different from initial result set 410 of query 130.

In some embodiments, one or more actions illustrated in blocks 502-512 may be performed for any number of queries received by simulation control proxy 102. Additionally, it is also understood that additional processes may be inserted before, during, or after blocks 502-512 discussed above. It is also understood that one or more of the blocks of method 500 described herein may be omitted, combined, or performed in a different sequence as desired.

VI. Example Computing System

Figure 6:
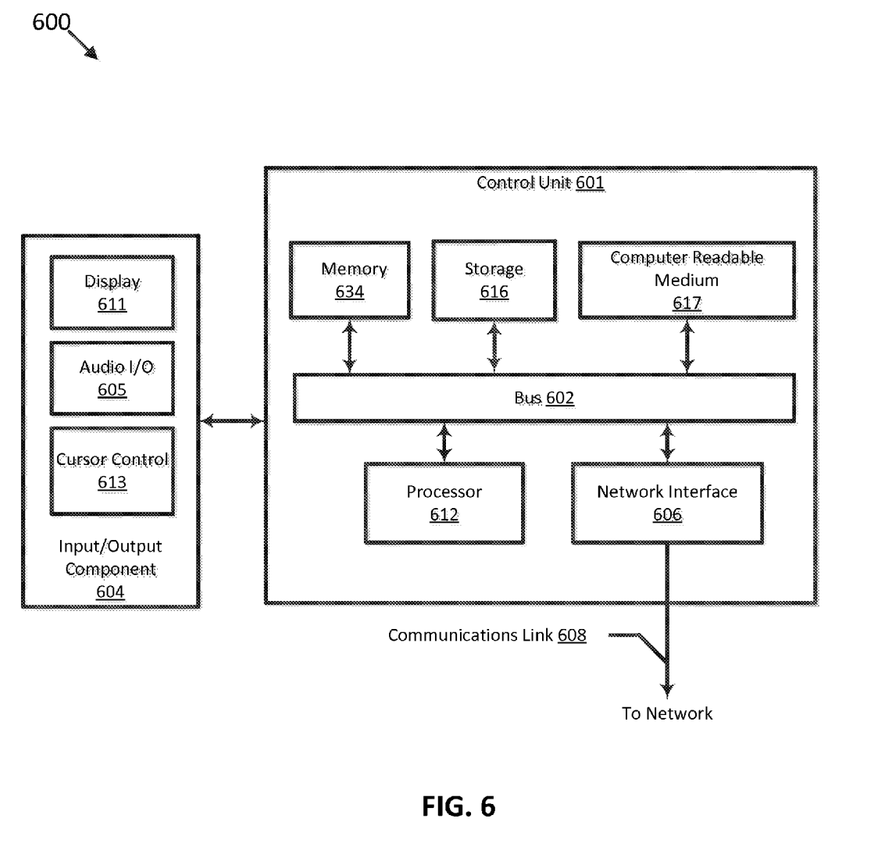
FIG. 6 is a block diagram of an electronic system suitable for implementing one or more embodiments of the present disclosure.

FIG. 6 is a block diagram of a computer system 600 suitable for implementing one or more embodiments of the present disclosure. Each of modification module 120 and data federation engine 122 may execute on a computing device. The computing device may include one or more storage devices each selected from a group including a floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the application server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 600 includes a bus 602 or other communication mechanism for communicating information data, signals, and information between various components of computer system 600. In an example, modification module 120 and data federation engine 122 may communicate using bus 602. A processor 612, which may be a microcontroller, digital signal processor (DSP), or other processing component, processes these various signals, such as for display on computer system 600 or transmission to other devices via communications link 608. Components of computer system 600 also include a system memory component 634 (e.g., RAM), a static storage component 616 (e.g., ROM), and/or a disk drive 617. Computer system 600 performs specific operations by processor 612 and other components by executing one or more sequences of instructions contained in system memory component 634.

Components include an input/output (I/O) component 604 that processes a user action, such as selecting keys from a keypad/keyboard, selecting one or more buttons or links, etc., and sends a corresponding signal to bus 602. I/O component 404 may include an output component such as a display 611, and an input control such as a cursor control 613 (such as a keyboard, keypad, mouse, etc.). An optional audio I/O component 605 may also be included to allow a user to use voice for inputting information by converting audio signals into information signals. Audio I/O component 605 may allow the user to hear audio. A transceiver or network interface 606 transmits and receives signals between computer system 600 and other devices via a communications link 608 to a network. In an embodiment, the transmission is wireless, although other transmission mediums and methods may also be suitable.

Logic may be encoded in a computer readable medium 617, which may refer to any medium that participates in providing instructions to processor 612 for execution. Such a medium may take many forms, including but not limited to, non-volatile media, volatile media, and transmission media. In various implementations, non-volatile media includes optical, or magnetic disks, or solid-state drives, volatile media includes dynamic memory, such as system memory component 634, and transmission media includes coaxial cables, copper wire, and fiber optics, including wires that include bus 602. In an embodiment, the logic is encoded in non-transitory computer readable medium. Transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read. In various embodiments of the present disclosure, execution of instruction sequences (e.g., method 500) to practice the present disclosure may be performed by computer system 600. In various other embodiments of the present disclosure, a plurality of computer systems 600 coupled by communications link 608 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable media. It is also contemplated that the application software identified herein may be implemented using one or more general purpose or specific purpose computers and/or computer systems, networked and/or otherwise. Where applicable, the ordering of various blocks described herein may be changed, combined into composite blocks, and/or separated into sub-blocks to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Changes may be made in form and detail without departing from the scope of the present disclosure. Thus, the scope of the disclosure should be limited only by the following claims, and it is appropriate that the claims be construed broadly and in a manner consistent with the scope of the embodiments disclosed herein.

What is claimed is:

1. A method of providing simulated control of a third-party database to a client, comprising:
receiving, at a simulation control proxy, a modification query including a command that updates a database table stored in a third-party database, the command being an insertion command, a deletion command, or an update command;
receiving, at the simulation control proxy, an initial result set of a query that selects from the database table data satisfying a set of conditions, the initial result set including a first set of database records;
determining whether a data storage device includes modification data indicating that the initial result set is stale, the modification data corresponding to the modification query and a second set of database records;
updating the initial result set in accordance with the modification data if the initial result set is stale, wherein if the command is the insertion command, updating the initial result includes inserting one or more database records of the second set satisfying the set of conditions into the initial result, wherein if the command is the deletion command, updating the initial result includes removing from the initial result each database record that corresponds to a database record of the second set, and wherein if the command is the update command, updating the initial result includes replacing each value in the initial result set with a corresponding value in the second set of database records; and
sending the updated result set of the query to a client, the updated result set of the query being different from the initial result set of the query.

2. The method of claim 1, wherein the third-party database includes one or more database tables, the method further including:
storing the modification data based on the modification query into the data storage device, the modification data indicating one or more modifications to the third-party database.

3. The method of claim 2, wherein the storing the modification data includes storing the modification query into the data storage device, and wherein the updating the initial result set further includes creating the second set of database records based on the modification query.

4. The method of claim 3,
wherein the storing the modification data includes storing the second set of database records into the data storage device.

5. The method of claim 1, wherein the command is the insertion command and wherein the initial result set is stale if the modification data indicates that data from the second set of database records satisfies the first query.

6. The method of claim 1, wherein the command is the deletion command, and wherein the initial result set is stale if the modification data indicates that one or more database records in the initial result set corresponds to one or more database records in the second set of database records.

7. The method of claim 1, wherein the command is the update command, and wherein the initial result set is stale if one or more database records in the initial result set corresponds to one or more database records of the second set of database records.

8. The method of claim 1, further comprising:
after updating the initial result set, determining whether a subset of database records in the updated initial result set satisfy the query; and
in response to a determination that the subset does not satisfy the query, removing from the updated initial result set the subset of database records that fail to satisfy the query.

9. The method of claim 8, wherein removing from the updated initial result set the database records that fail to satisfy the query includes before sending the updated result set of the query to the client, removing from the updated initial result set the database records that fail to satisfy the query.

10. The method of claim 1, further including:
mapping an account stored in the third-party database to a plurality of user credentials stored in an authentication database, the account being authenticated based on first user credentials;
authenticating second user credentials provided by the client;
determining whether the client is authorized to submit the query to the third-party database; and
providing the first user credentials and the query to the third-party database if the client is authenticated and authorized to submit the query to the third-party database.

11. The method of claim 1, wherein columns in the first set of database records are the same as columns in the updated result set sent to the client. base.

12. A system for providing simulated control of a third-party database, comprising:
a modification module that receives a modification query including a command that updates a database table stored in a third-party database and that receives an initial result set of a query that selects from the database table data satisfying a set of conditions, wherein the initial result set includes a first set of database records; and a data federation engine that determines whether a data storage device includes modification data indicating that the initial result set is stale, wherein the modification data corresponds to the modification query and a second set of database records, wherein the data federation engine updates the initial result set in accordance with the modification data if the initial result set is stale, and sends the updated result set of the query to a client, wherein if the command is an insertion command, the data federation engine inserts one or more database records of the second set satisfying the set of conditions into the initial result, wherein if the command is a deletion command, the data federation engine removes from the initial result each database record that corresponds to a database record of the second set, and wherein if the command is an update command, the data federation engine replaces each value in the initial result set with a corresponding value in the second set of database records, and wherein the updated result set of the query is different from the initial result set of the query.

13. The system of claim 12, further including:
a data storage device that stores modification data indicating whether one or more database records in the initial result set is stale.

14. The system of claim 12, wherein the data storage device is separate from the third-party database, and the client is unable to modify the third-party database.

15. The system of claim 12, wherein the command is the insertion command, and wherein the initial result set is stale if the modification data indicates that data from the second set of database records satisfies the query.

16. The system of claim 12, wherein the command is the deletion command, and wherein the initial result set is stale if the modification data indicates that one or more database records in the initial result set corresponds to one or more database records in the second set of database records.

17. The system of claim 12, wherein the command is the update command, and wherein the initial result set is stale if one or more database records in the initial result set corresponds to one or more database records of the second set of database records.

18. The system of claim 12, further including:
an authentication database storing user credentials to which an account stored in third-party database is mapped, wherein the modification module authenticates first user credentials provided by the client, determines whether the client is authorized to submit the query to the third-party database, and provides second user credentials and the query to the third-party database if the client is authenticated and authorized to submit the query to the third-party database, wherein the account is authenticated based on the second user credentials.

19. The system of claim 12, wherein the first set of database records has the same columns as the updated result set sent to the client.

20. A machine-readable medium comprising a plurality of machine-readable instructions that when executed by one or more processors is adapted to cause the one or more processors to perform a method comprising:
receiving, at a simulation control proxy, a modification query including a command that updates a database table stored in a third-party database;
receiving, at the simulation control proxy, an initial result set of a query that selects from the database table data satisfying a set of conditions, the initial result set including a first set of database records;
determining whether a data storage device includes modification data indicating that the initial result set is stale, the modification data being in accordance with the modification query and corresponding to a second set of database records;
updating the initial result set in accordance with the modification data if the initial result set is stale, wherein if the command is an insertion command, updating the initial result includes inserting one or more database records of the second set satisfying the set of conditions into the initial result, wherein if the command is a deletion command, updating the initial result includes removing from the initial result each database record that corresponds to a database record of the second set, and wherein if the command is an update command, updating the initial result includes replacing each value in the initial result set with a corresponding value in the second set of database records; and
sending the updated result set of the query to a client, the updated result set of the query being different from the initial result set of the query.

\* \* \* \* \*